(12) United States Patent
Sailing, Sr. et al.

(10) Patent No.: US 11,028,898 B2
(45) Date of Patent: Jun. 8, 2021

(54) COUPLINGS THAT ACTIVELY STABILIZE VIBRATIONS

(71) Applicant: The Boeing Company, Chicago, IL (US)

(72) Inventors: John D. Sailing, Sr., Covington, WA (US); Jonathan Y. Ahn, Seattle, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/245,972

(22) Filed: Jan. 11, 2019

(65) Prior Publication Data

US 2020/0224746 A1 Jul. 16, 2020

(51) Int. Cl.

| | |
|---|---|
| *F16F 15/14* | (2006.01) |
| *B64F 5/10* | (2017.01) |
| *B64C 17/00* | (2006.01) |
| *F16F 15/18* | (2006.01) |
| *F16F 15/30* | (2006.01) |
| *G01H 11/08* | (2006.01) |

(52) U.S. Cl.
CPC .......... *F16F 15/1485* (2013.01); *B64C 17/00* (2013.01); *B64F 5/10* (2017.01); *F16F 15/18* (2013.01); *F16F 15/30* (2013.01); *G01H 11/08* (2013.01)

(58) Field of Classification Search
CPC ........ F16F 15/1485; F16F 15/18; F16F 15/30; B64C 17/00; G01H 11/08
See application file for complete search history.

(56) References Cited

U.S. PATENT DOCUMENTS

| | | | | |
|---|---|---|---|---|
| 5,693,990 | A * | 12/1997 | Miyazaki | F16F 15/03 248/550 |
| 5,761,940 | A | 6/1998 | Moore, Jr. et al. | |
| 6,064,129 | A * | 5/2000 | Pompei | B60K 5/1283 310/12.01 |
| 6,095,547 | A * | 8/2000 | Vandergrift | A63C 9/00 280/602 |
| 7,275,627 | B1 * | 10/2007 | Mayama | F16F 7/1005 188/378 |

(Continued)

FOREIGN PATENT DOCUMENTS

| | | |
|---|---|---|
| DE | 102008005300 A1 | 11/2008 |
| EP | 1001184 A2 | 5/2000 |

(Continued)

OTHER PUBLICATIONS

Satomi hattori et al.; Suppression Control Method of Torque Vibration for Brushless DC Motor Utilizing Repetitive control with fourier Transform; Trans. of the Society of Instrument and control Engineers; vol. E-2, No. 1, 42/53 (2002).

(Continued)

*Primary Examiner* — Vicky A Johnson
(74) *Attorney, Agent, or Firm* — Duft & Bornsen, PC

(57) ABSTRACT

Systems and methods are provided for active vibration damping. One embodiment is a method for damping vibration in a mechanical system. The method includes detecting a vibration at a coupling of the mechanical system, generating a countervibration based on the detected vibration, and operating the mechanical system while generating the countervibration.

20 Claims, 17 Drawing Sheets

(56) References Cited

U.S. PATENT DOCUMENTS

| | | | | |
|---|---|---|---|---|
| 2013/0131950 A1* | 5/2013 | Kim | ................ | G05D 19/02 |
| | | | | 701/99 |
| 2015/0028152 A1* | 1/2015 | Eller | ................ | B64C 27/001 |
| | | | | 244/17.13 |
| 2015/0377318 A1* | 12/2015 | Byrne | ................ | F04B 53/006 |
| | | | | 700/282 |
| 2017/0274981 A1* | 9/2017 | Shiosaki | ................ | B64C 11/32 |
| 2018/0170532 A1* | 6/2018 | Black | ................ | G01M 5/0066 |
| 2020/0224746 A1* | 7/2020 | Sailing, Sr. | ................ | F16F 15/1485 |

FOREIGN PATENT DOCUMENTS

| | | |
|---|---|---|
| EP | 1621794 A1 | 2/2006 |
| EP | 2016921 A2 | 1/2009 |

OTHER PUBLICATIONS

Vibration Motors—Precision Microdrives; https://www.precisionmicrodrives.com; Nov. 9, 2018.

European Search Report; Application EP19209923; dated Jul. 2, 2020.

European Patent Application Search Report EP1001184A3—dated Jul. 2, 2020.

European Patent Application Search Report EP2016921A3; dated Jul. 2, 2020.

\* cited by examiner

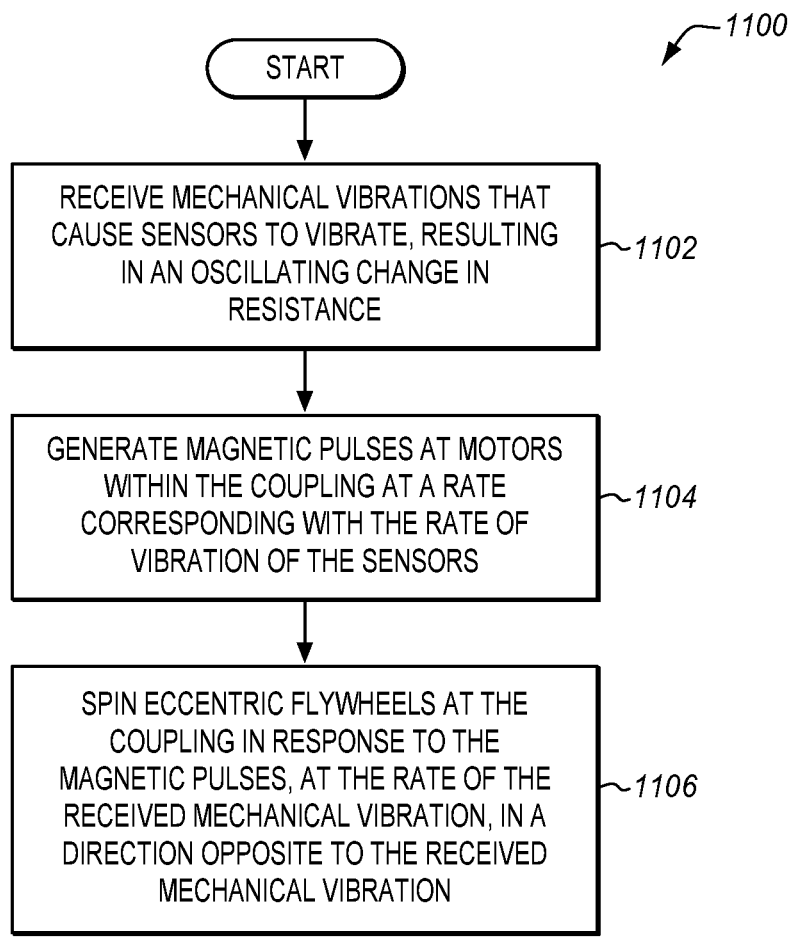

COUPLINGS THAT ACTIVELY STABILIZE VIBRATIONS

FIELD

The disclosure relates to the field of stabilization, and in particular, to damping mechanical vibrations.

BACKGROUND

Mechanical vibrations may be encountered in a variety of vehicles and fabrication environments. For example, a robot in a fabrication environment may encounter vibrations resulting from the travel of nearby heavy vehicles, may encounter vibrations caused by generators or other machinery operating in the fabrication environment, and may even encounter vibrations caused by its own internal components. These vibrations are transmitted from the base of the robot along a kinematic chain of the robot to an end effector. Upon reaching the end effector, the vibrations may displace the end effector. This may adversely impact a locational precision of the end effector, or may otherwise hinder the ability of the end effector to operate effectively. Many of these vibrations are unexpected, and the range of frequencies and amplitudes for these vibrations may vary substantially.

Mechanical vibrations may also be encountered in vehicles ranging from automobiles to mobile hospital beds. Damping mechanical vibrations for such vehicles may increase an amount of comfort and stability of those vehicles. Mechanical vibrations may even be encountered by scientific devices such as at the tip of an Atomic Force Microscopy (AFM) device. In such environments, it is desirable to reduce or control the transmission of unexpected vibrations to an end effector, in order to increase device accuracy.

Therefore, it would be desirable to have a method and apparatus that take into account at least some of the issues discussed above, as well as other possible issues.

SUMMARY

Embodiments described herein actively detect and damp mechanical vibrations via a coupling that utilizes vibration engines (e.g., magnetically actuated flywheels, solenoid motors, etc.) in order to generate countervibrations in response to detected vibrations. These countervibrations damp the vibrations encountered by the coupling, which enables a device affixed to the coupling (e.g., an end effector) to be stabilized and protected from unexpected vibration.

One embodiment is a method for damping vibration in a mechanical system. The method includes detecting a vibration at a coupling of the mechanical system, generating a countervibration based on the detected vibration, and operating the mechanical system while generating the countervibration.

A further embodiment is a non-transitory computer readable medium embodying programmed instructions which, when executed by a processor, are operable for performing a method for damping vibration in a mechanical system. The method includes detecting a vibration at a coupling of the mechanical system, generating a countervibration based on the detected vibration, and operating the mechanical system while generating the countervibration.

Yet another embodiment is an apparatus for damping vibration in a mechanical system. The apparatus includes a coupling which includes vibration detection sensors at the coupling, vibration engines at the coupling, and a controller that is coupled for communication with the vibration sensors and the vibration engines, and is configured to determine a magnitude and a frequency of a vibration detected by the vibration detection sensors, and to direct the vibration engines to generate a countervibration based on the magnitude and the frequency.

Other illustrative embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

FIG. 11 is a flowchart illustrating electrical control of a coupling to dynamically generate countervibration in an illustrative embodiment.

DESCRIPTION

The figures and the following description provide specific illustrative embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Figure 1:
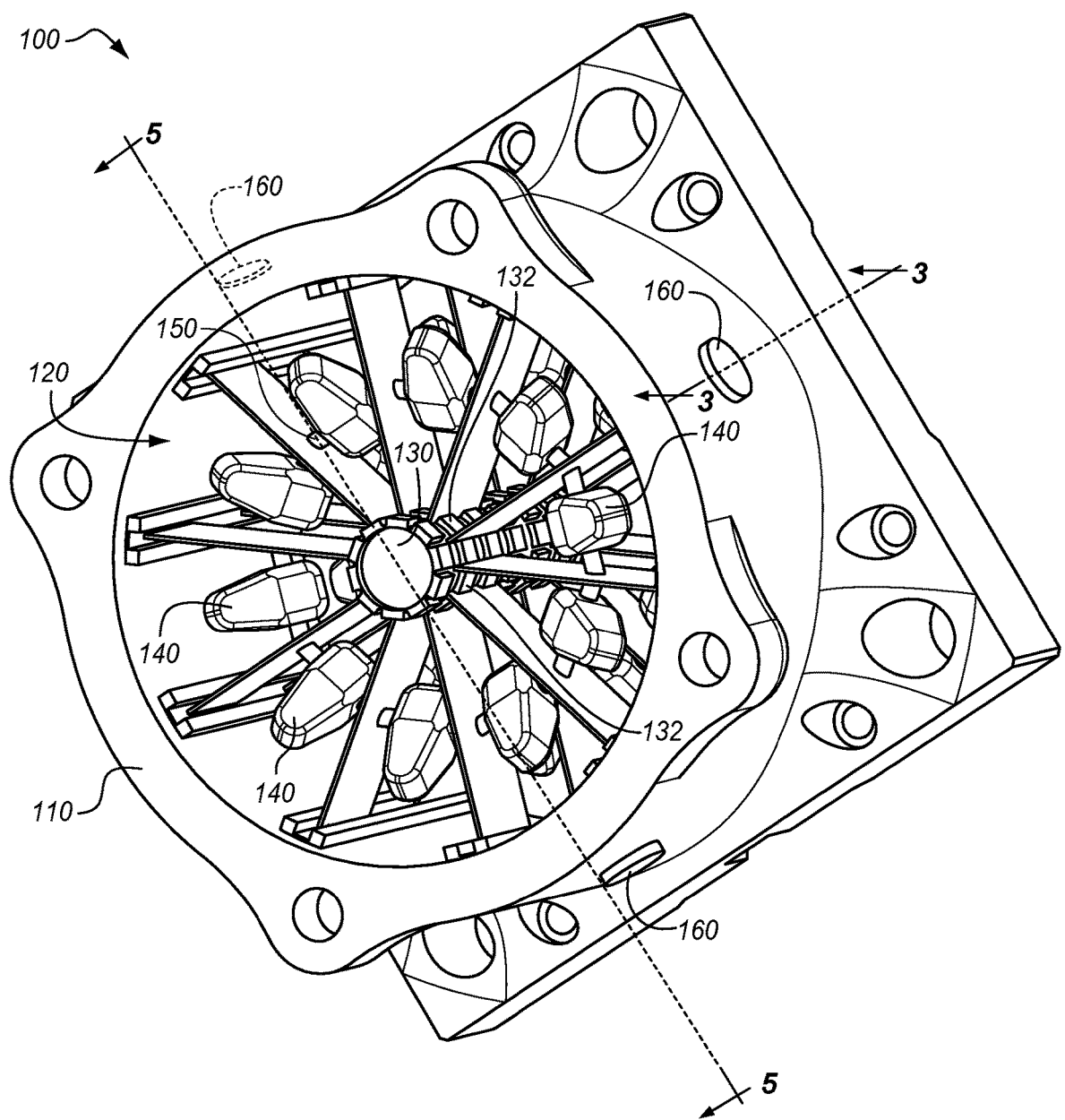
FIG. 1 is a perspective view of a coupling that actively damps vibration in an illustrative embodiment.

FIG. 1 is a perspective view of a coupling 100 that actively damps mechanical vibration in an illustrative embodiment. Coupling 100 comprises any system, device, or component operable to actively detect and damp mechanical vibrations in an operating mechanical system (e.g., a robot). Unlike a passive damping device such as a mass of rubber, coupling 100 is capable of detecting incoming vibrations, and generating countervibrations that cancel out the detected vibrations. This prevents the coupling from moving in response to received external vibrations. For example, a countervibration may match the frequency and magnitude of a detected vibration, but be applied in the opposite direction. In this example, countervibrations at the coupling are generated such that in any given instant, the coupling experiences less than a threshold amount of displacement (e.g., less than one millimeter, less than ten percent of an original magnitude of the vibrations, etc.).

In this embodiment, coupling 100 includes casing 110, which mechanically protects and houses a drive unit 120. Vibration detection sensors 160 at coupling 100 may detect the frequency, direction, and/or magnitude of incoming vibrations. Drive unit 120 includes a core 130 of motors 132, and vibration engines 140 which are arranged in multiple rings 150. As vibrations are detected by drive unit 120, motors 132 are activated in order to selectively drive the vibration engines 140 to generate countervibrations (which result in vibration cancellation). The vibration engines 140 may comprise electromagnetically actuated flywheels, Eccentric Rotating Mass (ERM) vibration motors, Linear Resonant Actuator (LRA) vibration motors, solenoid vibration motors, etc. Motors 132 may comprise magnetic field generators that apply torque to the vibration engines 140, or other components that apply forces which drive the vibration engines 140.

Illustrative details of the operation of coupling 100 will be discussed with regard to FIG. 2. Assume, for this embodiment, that coupling 100 has been mounted to a mechanical system in the form of a robot. For example, coupling 100 may be disposed between a base of the robot and an end effector of the robot, in order to prevent vibrations received at the base of the robot from being transmitted to the end effector. The robot is intended to perform work at precise locations on a part. Further, assume that the robot is located within a factory that is subject to vibrations caused by moving vehicles or other equipment. Vibrations travel from a base of the robot through the coupling and into an end effector, which impacts a positional accuracy of the end effector during operations.

Figure 2:
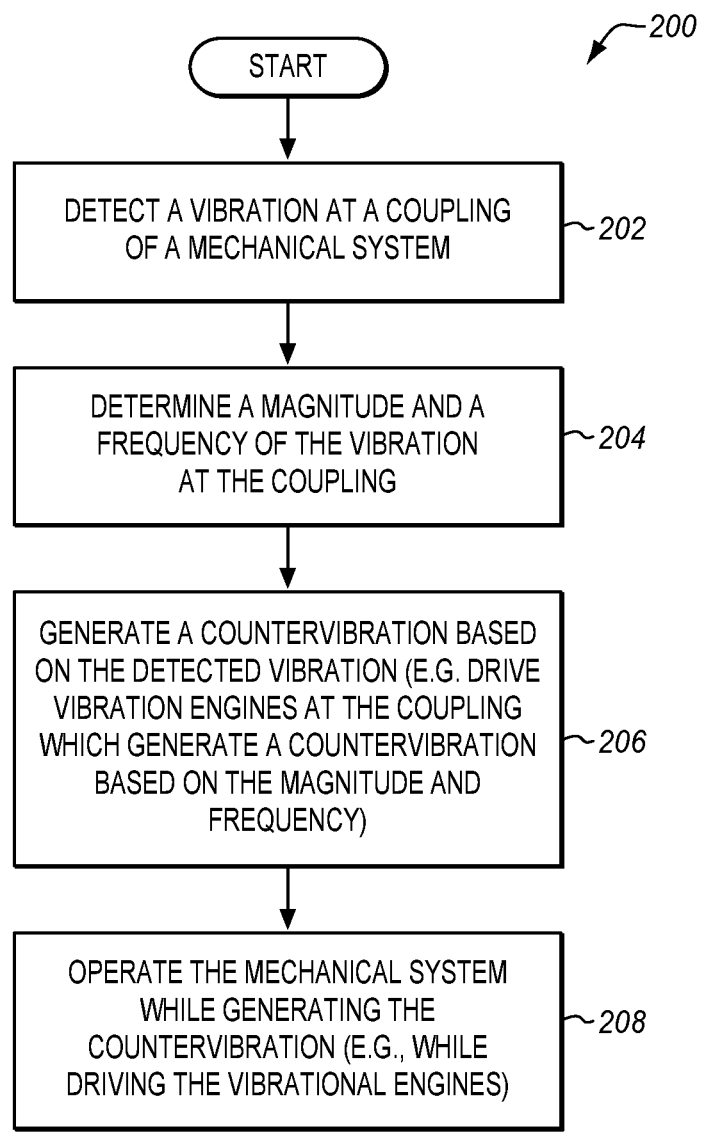
FIG. 2 is a flowchart illustrating a method for operating the coupling of FIG. 1 in an illustrative embodiment.

FIG. 2 is a flowchart illustrating a method 200 for operating the coupling of FIG. 1 in an illustrative embodiment. The steps of method 200 are described with reference to coupling 100 of FIG. 1, but those skilled in the art will appreciate that method 200 may be performed in other systems. The steps of the flowcharts described herein are not all inclusive and may include other steps not shown. The steps described herein may also be performed in an alternative order.

In step 202, drive unit 120 detects a vibration at coupling 100. For example, drive unit 120 may detect changes in resistance at one or more cantilevered piezoelectric sensors that are internally disposed within coupling 100 (e.g., as depicted in FIG. 10).

In step 204, drive unit 120 further determines a magnitude and a frequency of the vibration at coupling 100. The frequency is the rate at which the vibration cycles through the coupling 100, while the magnitude is the force or amount of displacement caused by the vibration at its peak. Drive unit 120 may further determine a direction of the vibration based on input from the sensors (e.g., as described with regard to FIG. 10). Based on this information, drive unit 120 identifies a countervibration that will cancel out the detected vibration.

In step 206, drive unit 120 generates a countervibration based on the detected vibration. For example, drive unit 120 may drive vibration engines 140 at the coupling 100. When driven, the vibration engines 140 generate a countervibration that corresponds with (e.g., matches) the magnitude and frequency of the vibration, yet is opposed to the direction of the vibration. The magnitude and the frequency of the countervibration may also be detected on an ongoing basis by any sensors at the coupling 100 in order to control the countervibration.

The countervibration combines with the vibration to prevent the coupling from displacing during operation. Specifically, the countervibration generates a force at the coupling 100 that cancels out a force caused by the vibration. This continues in an ongoing process, such that at each instant during which the vibration is being experienced, the drive unit 120 generates countervibration to prevent displacement. Countervibrations of a desired direction are generated by selectively operating groups of the vibration engines 140 based on their spatial arrangement. Countervibrations of a desired frequency are created by operating the vibration engines 140 at that frequency. For example, if a vibration proceeds vertically upwards and then downwards at a known rate, then the vibration engines may be operated to apply forces vertically downwards and then upwards at the same rate, in synchrony with the vibration. In one embodiment, this includes applying electrical energy intermittently at a frequency to a motor 132 (e.g., a solenoid motor), causing the motor to generate the countervibration at the frequency. While a slight delay (e.g., several microseconds, or several milliseconds) may exist between detection of a vibration and generation of a countervibration, the technique remains effective at damping vibrations received over time. Hence, coupling 100 operates as a reactive system that detects, analyzes, and damps incoming vibrations.

In step 208, the mechanical system (i.e., the robot) is operated while countervibration is being generating (e.g., while the vibration engines 140 are driven). Because the vibration engines 140 provide damping, the mechanical system may operate without being affected by external vibrations. For example, the robot may perform drilling via an end effector while vibration engines 140 are driven. This provides a technical benefit by enabling the mechanical system to operate an end effector without that end effector being displaced by mechanical vibration. The principles described herein may also be utilized to damp vibrations caused by an end effector, in order to prevent the end effector from generating vibrations at a base of a robot. This may be particularly beneficial for robots that utilize multiple end effectors at once.

Figure 3:
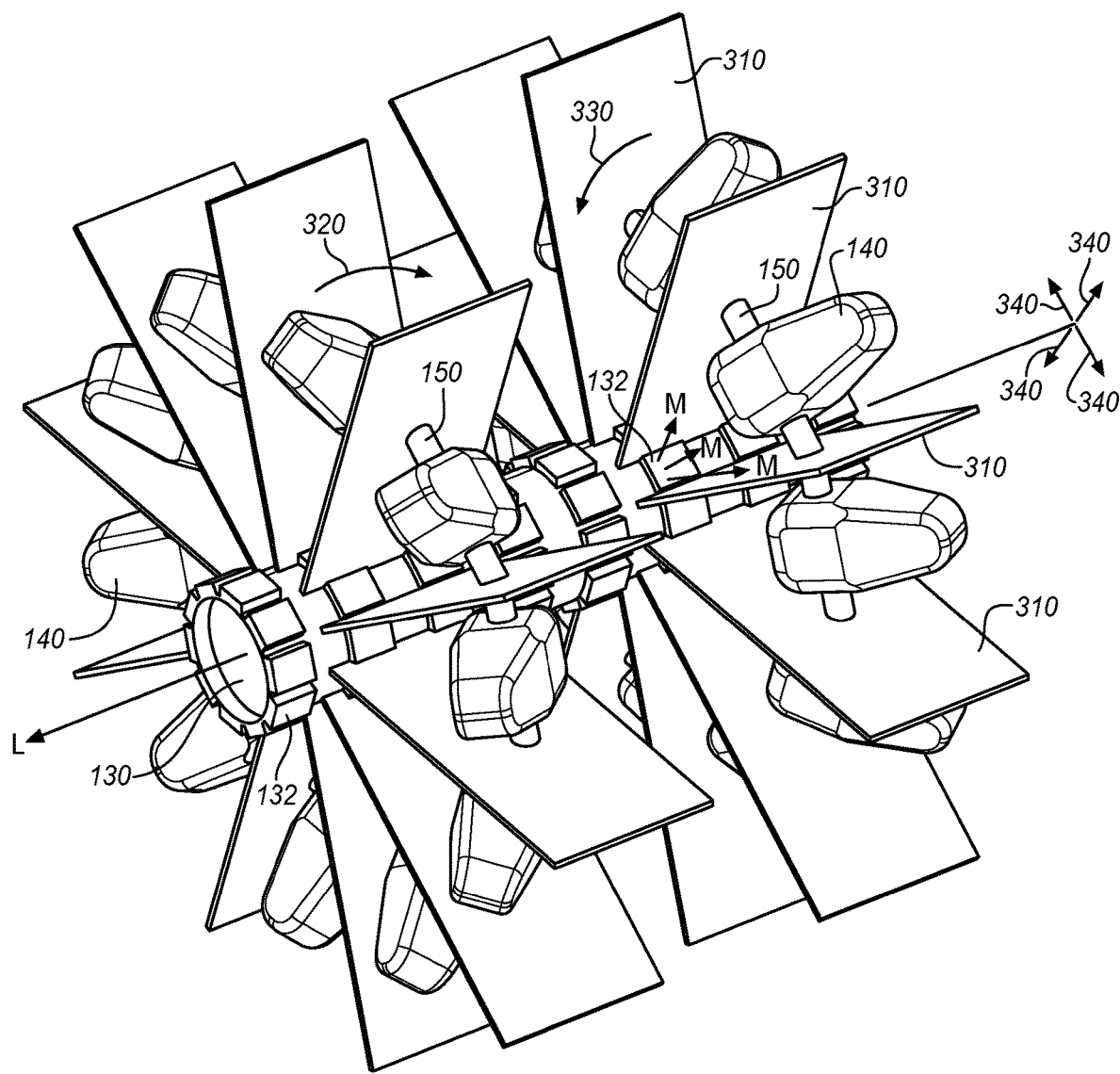
FIG. 3 is a perspective view of the coupling of FIG. 1 wherein a casing has been removed in an illustrative embodiment.

FIG. 3 is a perspective view of the coupling of FIG. 1, wherein casing 110 has been removed in an illustrative embodiment. FIG. 3 corresponds with view arrows 3 of FIG. 1. As shown in FIG. 3, drive unit 120 includes at least two of rings 150. Each ring 150 includes vibration engines 140. Rings 150 enable a geometric arrangement of vibration engines 140 that permits damping of vibrations received from a wide range of directions. Vibration engines 140 along each ring 150 are disposed at different angular positions. Each vibration engine 140 is depicted in the form of an eccentric flywheel (e.g., as depicted by eccentric flywheels 450 of FIG. 4) or cam. Each vibration engine 140 is magnetically shielded from other vibration engines 140 by shields 310. This allows each vibration engine 140 to be independently driven by a different one of motors 132. Shields 310 may be made of any suitable material that is opaque to magnetic fields, such as steel or an iron-nickel alloy. The shields 310 are rectangular in order to deflect a variety of potential angles of infiltration of magnetic fields. For example, shields 310 may deflect a magnetic pulse M from a motor 132 depicted in FIG. 3, preventing the magnetic pulse M from driving more than one vibration engine. The shields 310 are thin in order to reduce weight at the coupling.

In order to generate vibrations back and forth along the axial length L of drive unit 120, vibration engines 140 selected from both rings 150 may be driven synchronously clockwise or counterclockwise. Alternatively, in order to generate vibrations without moving drive unit 120 back and forth axially, vibration engines 140 in one of rings 150 may be driven in the opposite direction as vibration engines 140 in another of rings 150, but at the same rate. That is, vibration engines 140 in one of ring 150 may be driven clockwise 320, while vibration engines 140 in the other ring may be driven counterclockwise 330 at the same rate. This prevents the vibration engines 140 from generating forces in line with the axial length L of drive unit 120. Similar techniques may be used for vibration engines 140 within a ring 150 in order to control displacement in directions 340 that are perpendicular to axial length L. Stated succinctly, components of vibration generated by one vibration engine 140 may be countered or amplified by actions of other vibration engines 140 in order to create a countervibration of desired direction, frequency, and amplitude. Selective activation of vibration engines 140 enables drive unit 120 to apply not just displacement, but also torque to coupling 100 in a controlled manner.

Figure 4:
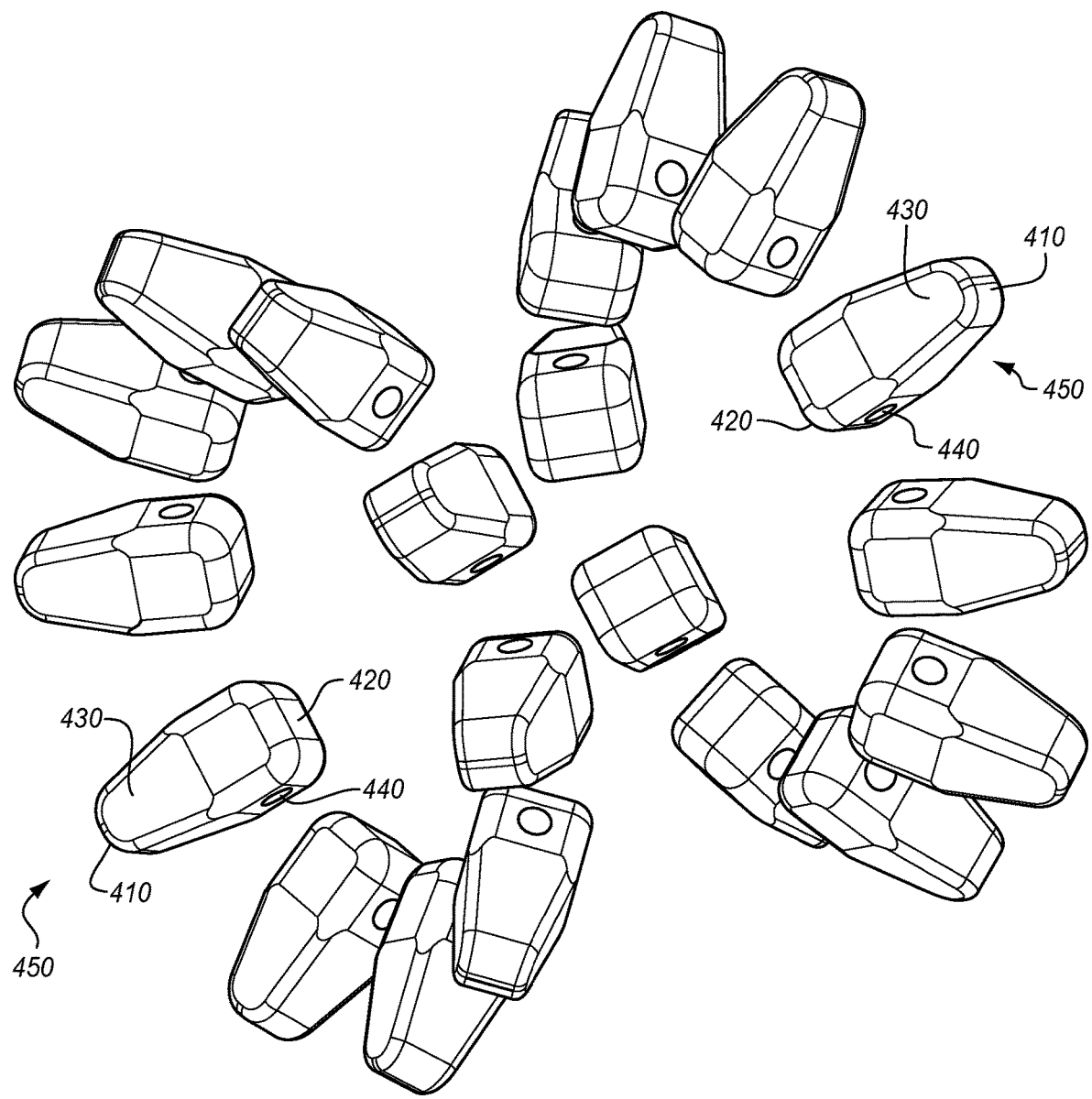
FIG. 4 is a perspective view of an arrangement of vibration engines within the coupling of FIG. 1 in an illustrative embodiment.

FIG. 4 is a perspective view of an arrangement of vibration engines 140 within the coupling 100 of FIG. 1 in an illustrative embodiment. FIG. 4 corresponds with view arrows 3 of FIG. 1. This FIG. shows the vibration engines 140 without the other structural components shown in FIG. 3). In FIG. 4, each vibration engine 140 comprises an eccentric flywheel 450 having a magnetic portion having a tip 410 and a base 420. Note that rings 150, to which eccentric flywheels 450 are attached, are omitted for the sake of enhancing clarity. The base 420 includes a hole 440 for receiving a ring 150. Tip 410 is distal from the hole 440, and therefore spins about ring 150 when eccentric flywheel 450 is operated. Tip 410 includes a magnetic portion 430 which may receive magnetic forces in order to initiate spinning, halt spinning, or change the direction of spinning for the eccentric flywheel 450. While in operation, one eccentric flywheel 450 may rotate in one direction, while a neighboring flywheel may rotate in the same or a different direction.

Figure 5:
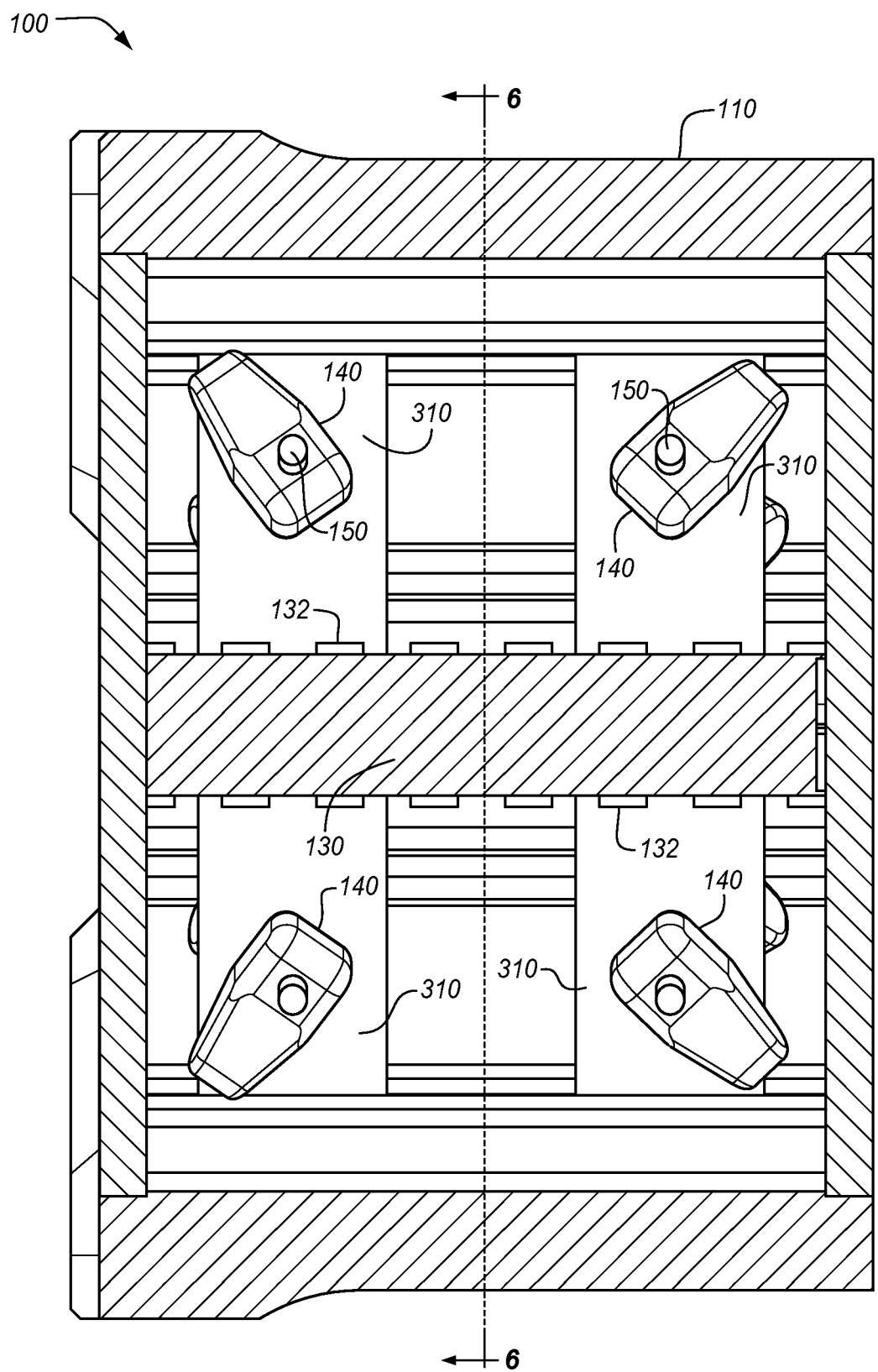
FIG. 5 is a section cut side view of the coupling of FIG. 1 in an illustrative embodiment.
Figure 6:
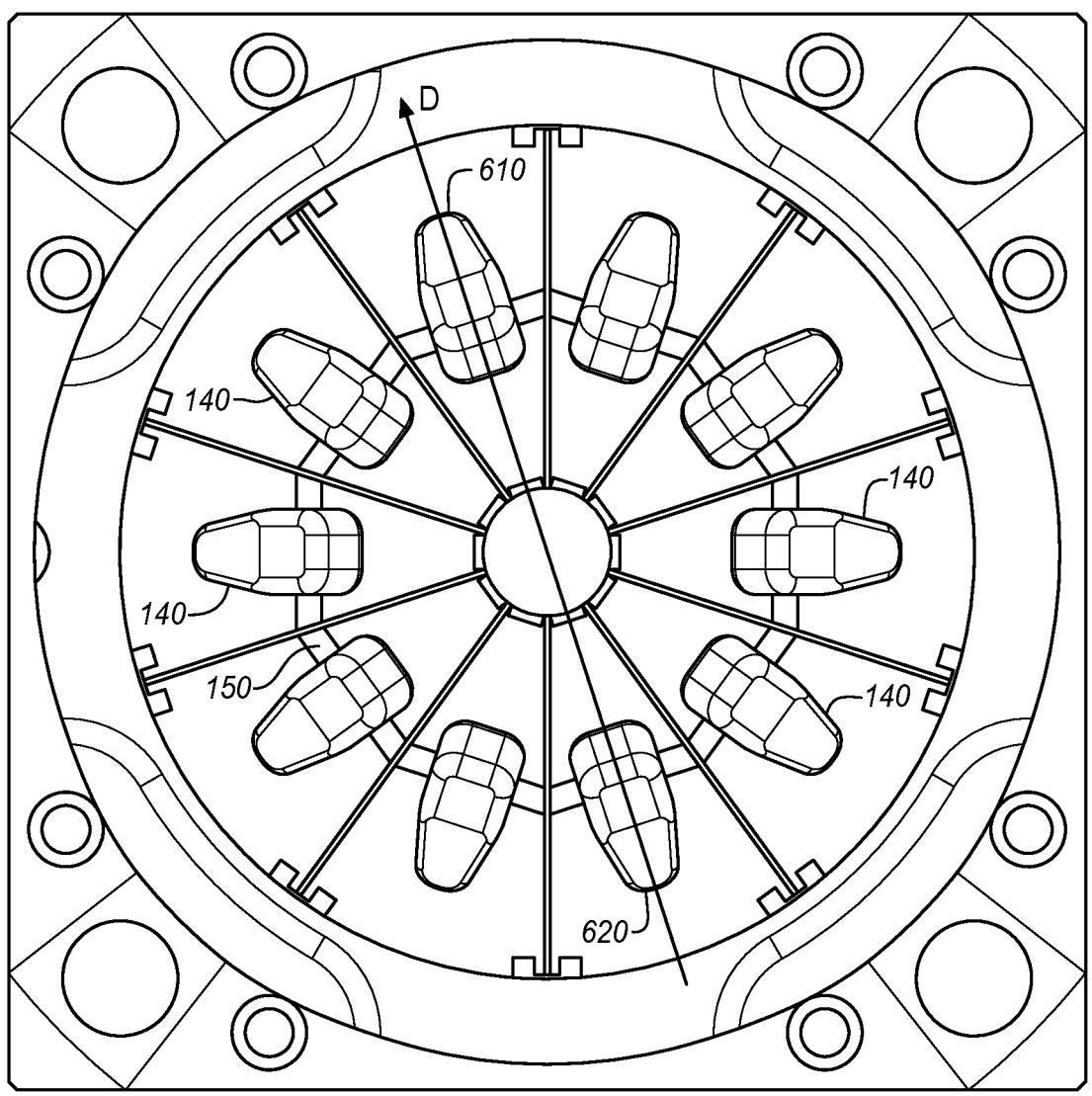
FIG. 6 is a section cut front view of the coupling of FIG. 1 in an illustrative embodiment.

FIG. 5 is a section cut side view of the coupling 100 of FIG. 1 in an illustrative embodiment. FIG. 5 corresponds with view arrows 5 of FIG. 1, and illustrates motors 132, vibration engines 140, and shields 310 within casing 110 from a different viewpoint. FIG. 6 is a section cut front view of the coupling of FIG. 1 in an illustrative embodiment. FIG. 6 corresponds with view arrows 6 of FIG. 5. FIG. 6 illustrates that the vibration engines 140 are arranged symmetrically within a ring 150. For example, first vibration engine 610 and second vibration engine 620 are symmetrically disposed with respect to core 130. Hence, the first vibration engine 610 and the second vibration engine 620 may be used in a coordinated fashion in order to apply countervibrations along or against direction D. Forces generated by the first vibration engine 610 and the second vibration engine 620 into or out of the page may be compensated by a similarly oriented pair of vibration engines in another ring 150.

Figure 7:
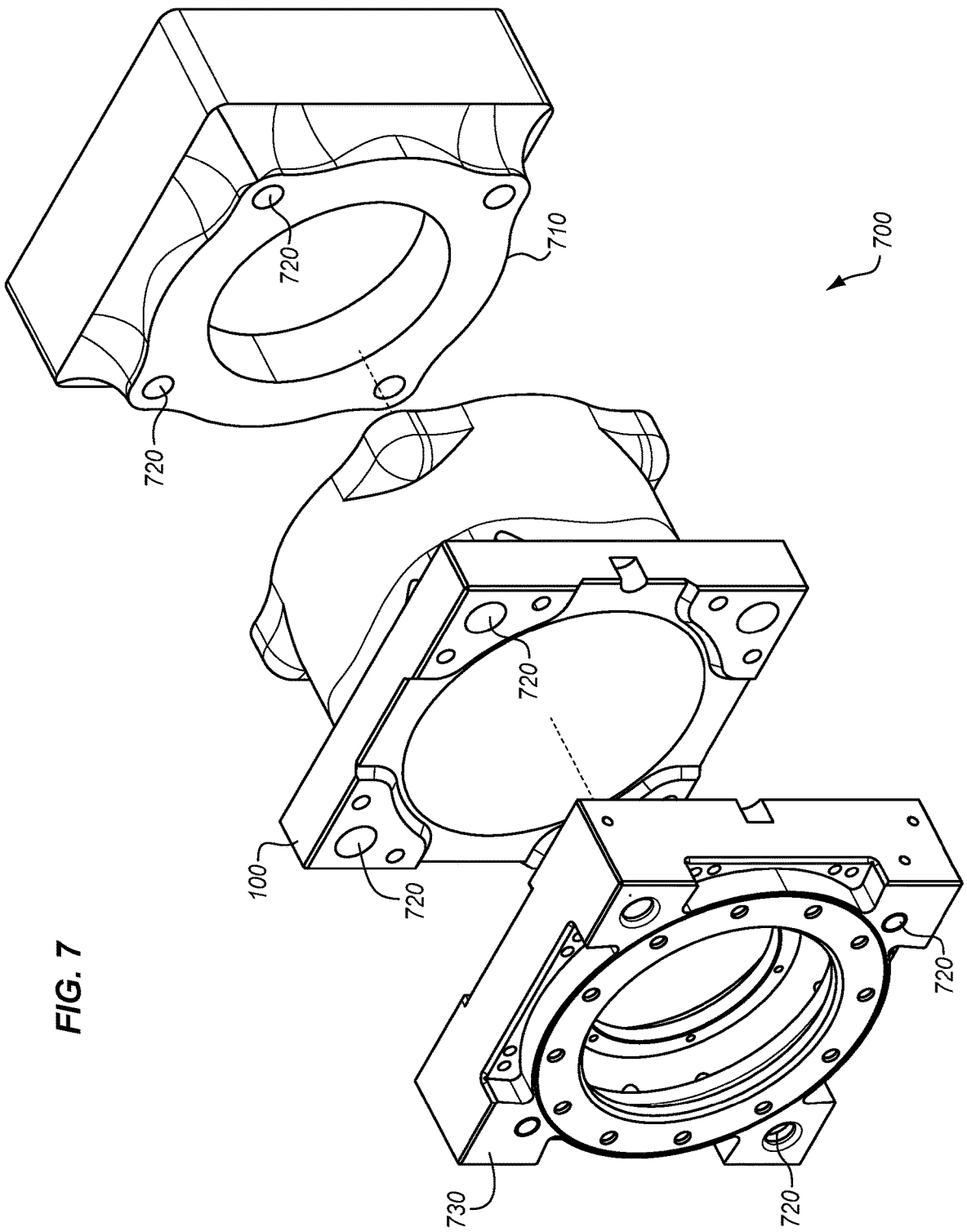
FIG. 7 is an exploded perspective view of the coupling of FIG. 1 accompanied by adapters in an illustrative embodiment.
Figure 8:
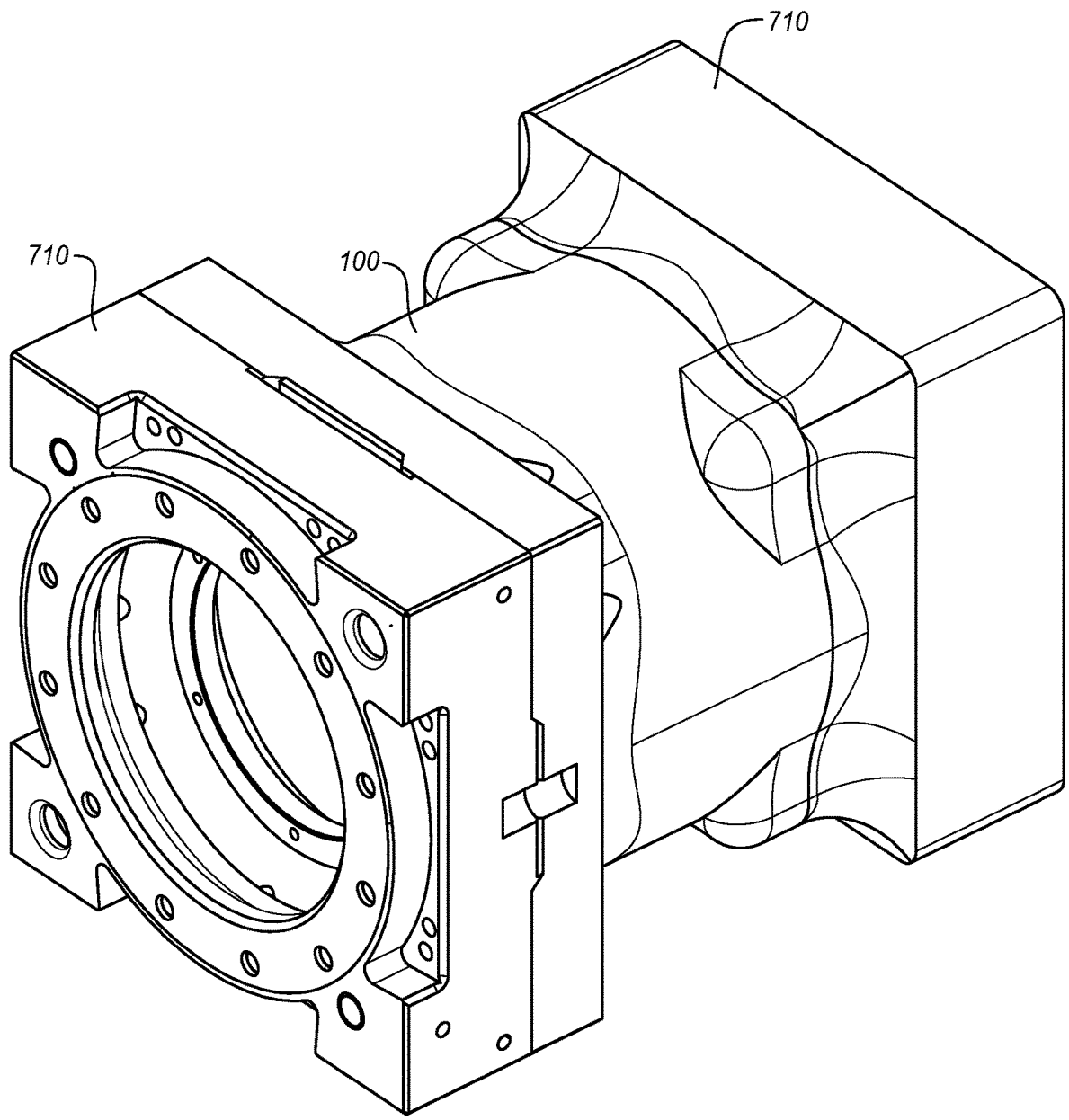
FIG. 8 is a perspective view of the coupling of FIG. 1 accompanied by adapters in an illustrative embodiment.

FIG. 7 is an exploded perspective view of the coupling of FIG. 1 accompanied by adapter 710 and adapter 730 in an illustrative embodiment. Adapter 710 and adapter 730 enable coupling 700 to be attached between a kinematic chain of a robot (e.g., integrated into a robot arm) or other mechanical system and an end effector, in order to perform damping of mechanical vibrations between these elements. However, in further embodiments the coupling 100 may be positioned to damp vibrations at any location within any suitable mechanical system. For example, coupling may be placed beneath the base of a robot in one embodiment. FIG. 7 also depicts a variety of mounting holes 720, which may receive bolts or other fasteners in order to affix adapter 710 and adapter 730 to coupling 100 and/or each other. In FIG. 8, adapter 710 and adapter 730 have been attached to coupling 700 in order to facilitate integration of coupling 100 within a mechanical system.

Figure 9:
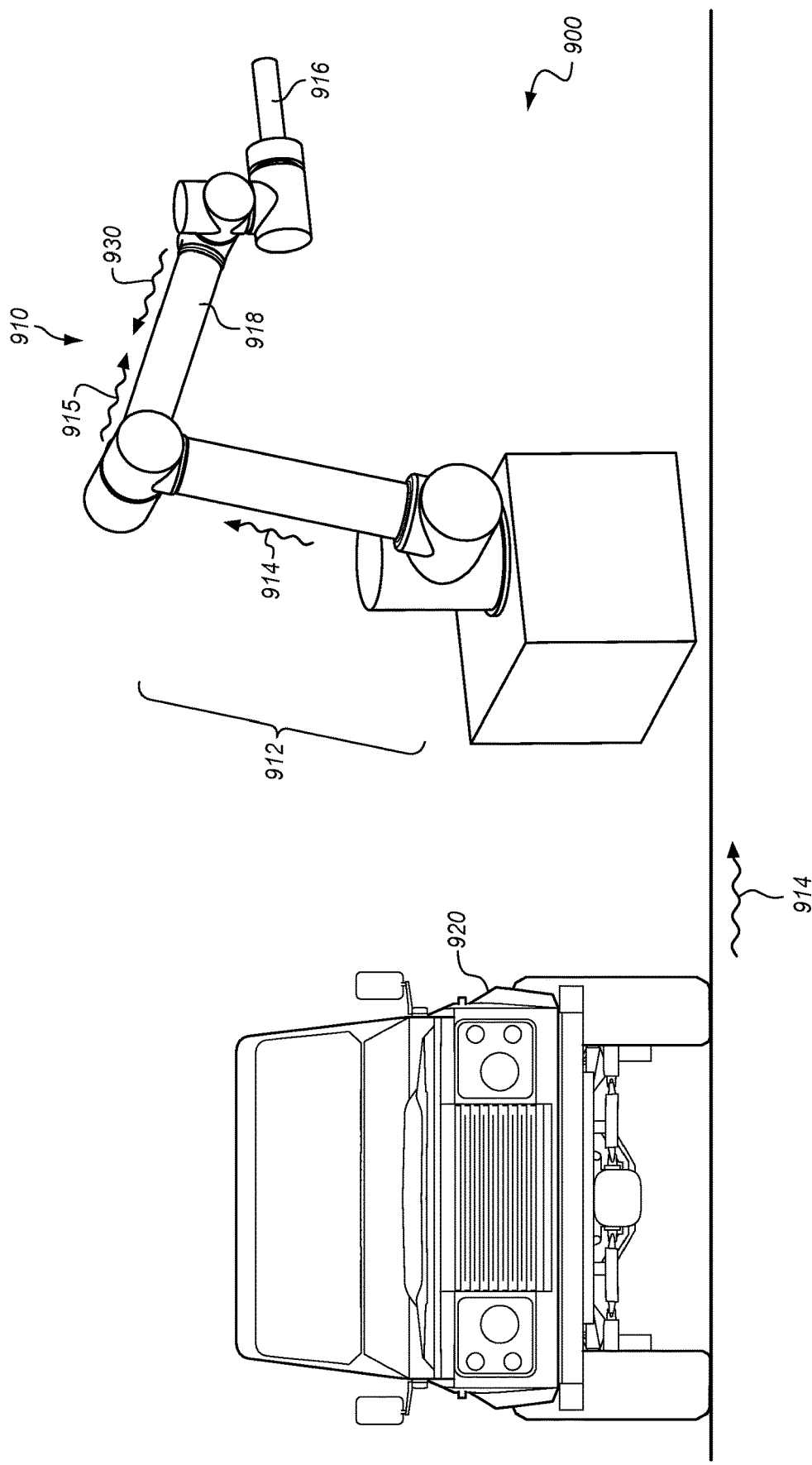
FIG. 9 is a diagram illustrating a robot utilizing a coupling in an illustrative embodiment.

FIG. 9 is a diagram illustrating a robot 910 utilizing a coupling in an illustrative embodiment. Robot 910 is disposed within fabrication environment 900, and performs work upon parts in order to fabricate those parts. For example, robot 910 may perform drilling, welding, riveting, etc. via an end effector 916. While robot 910 operates, vibrations 914 caused by vehicles 920 traveling within fabrication environment 900 are transferred along a kinematic chain 912 and travel towards end effector 916. The vibrations 914 combine with any vibrations created at the robot 910 to result in vibrations 915, which reach coupling 918. This may affect positional control at end effector 916, which may impact the accuracy of end effector 916 during operation or otherwise impair the quality of fabrication of parts being worked on. Coupling 918 is disposed between elements of the kinematic chain 912 and end effector 916, and generates countervibrations 930 that damp the vibrations 915. This stabilizes end effector 916 by preventing its displacement.

Figure 10A:
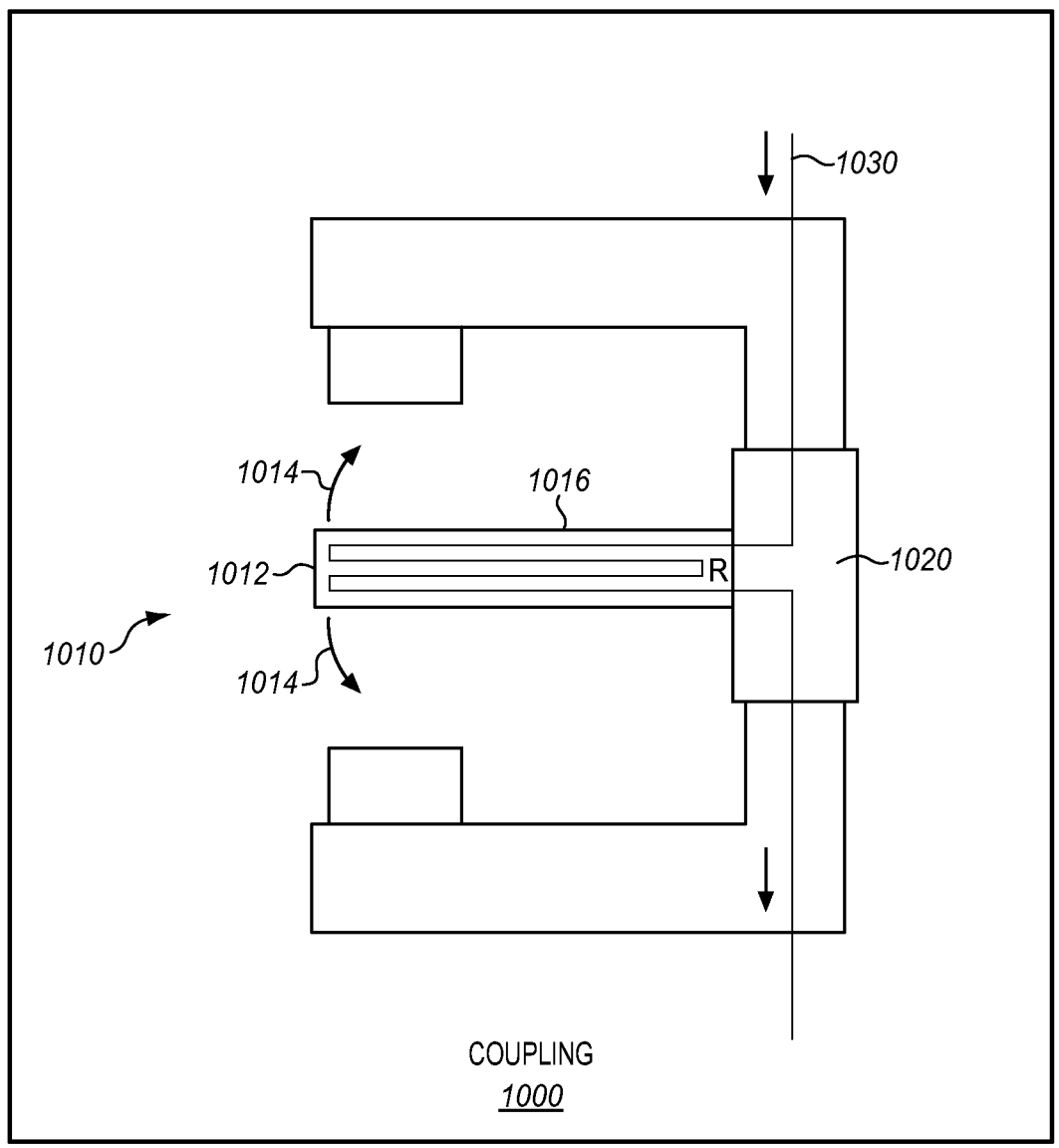
FIGS. 10A-10B are diagrams illustrating a sensor within a coupling that oscillates in response to vibrations in an illustrative embodiment.
Figure 10B:
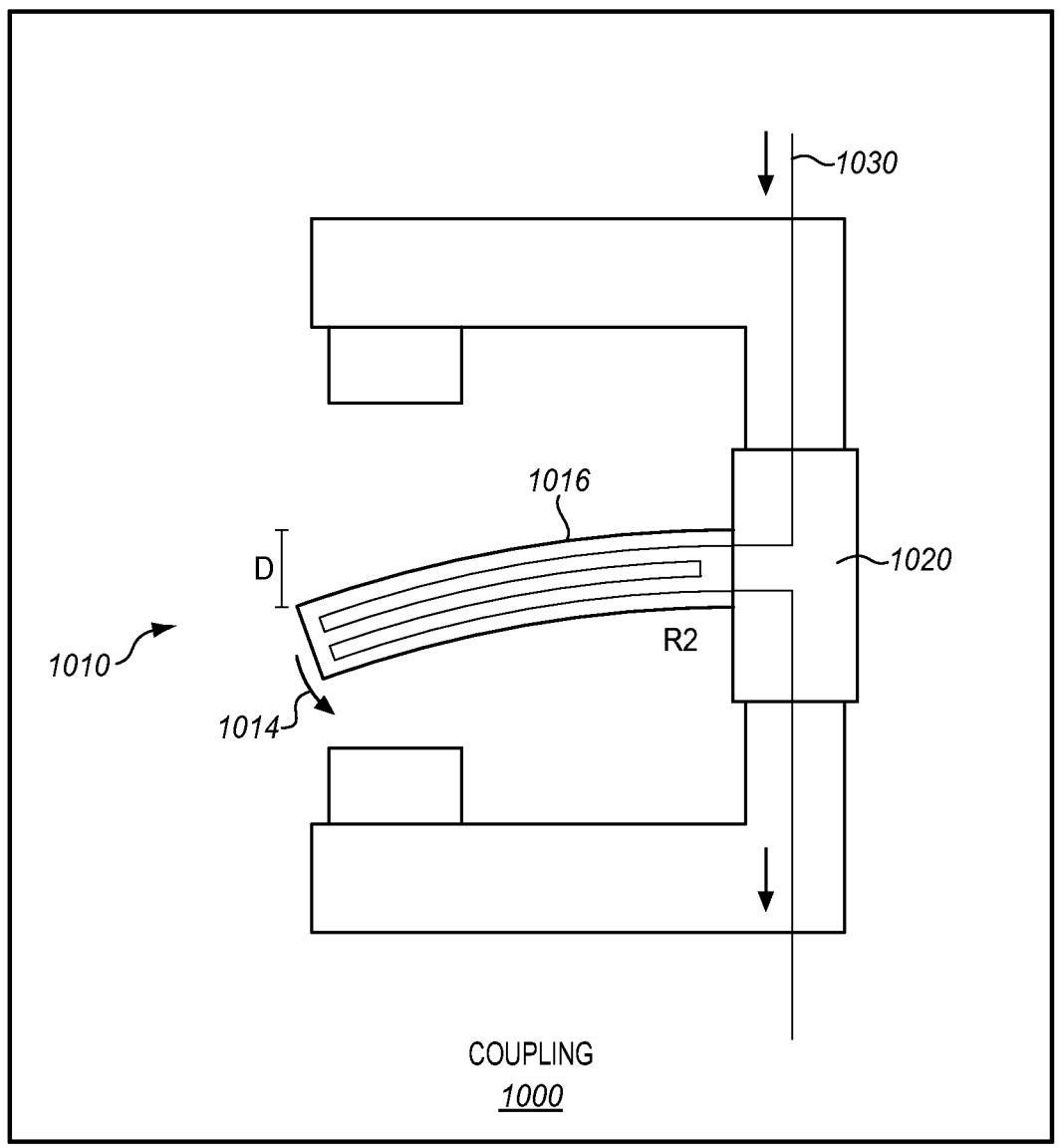

FIG. 10A depicts further details of sensors that may be utilized within a coupling. The coupling actively damps mechanical vibration. Specifically, FIG. 10 is a diagram illustrating a sensor 1010 within a coupling 1000. The sensor 1010 oscillates 1014 in response to vibrations in an illustrative embodiment. In this embodiment, sensor 1010 comprises a cantilevered piezoelectric hair sensor 1016 that projects from base 1020 and exhibits a changing amount of electrical resistance R in response to deflection of its tip 1012. Sensor 1010 may be integrated, for example, into a Wheatstone bridge. When mechanical vibrations travel through the coupling, the vibrations cause the tip 1012 to deflect an amount D as shown in FIG. 10B, the resistance of current pathway 1030 changes to R2. In short, when the hair sensor vibrates, its resistance changes. In a suitably designed system, this leads to a change in current along current pathway 1030. The increase in current causes magnetic pulse generators to apply more force to vibration engines, which spin faster since there is more magnetic force being applied to their tips.

Changes in resistance caused by multiple sensors 1010 at different locations and orientations within the coupling 1000 may be electrically detected and analyzed in order to determine the magnitude and frequency of incoming vibrations. Because the orientations of sensors 1010 are known within the coupling, amounts of vibration from sensors 1010 at different orientations may be compared in order to determine a direction in which the vibration is occurring. This information may then be used to drive vibration engines disposed at the coupling.

In further embodiments, the coupling is configured to prevent itself from self-exciting in response to its own vibrations. A self-exciting state may occur, for example, if there are no external vibrations, the vibration engines comprise flywheels spinning at a steady state, and one of the flywheels becomes imbalanced. In such a circumstance, the vibrations of the imbalanced flywheel may be perceived by the hair sensors as external, which may speed up the imbalanced flywheel, resulting in an even greater increase in vibration.

In order to prevent such self-excited states, in one embodiment, there are three more hair sensors than the total number of vibration engines. These additional hair sensors govern the overall current being supplied to the rest of the drive unit within the coupling. They each are orientated to monitor one of the three axes along which vibrations are received at the coupling, and may be used to distinguish external from self-induced internal vibrations. For example, each of vibration detection sensors 160 depicted in FIG. 1 may monitor vibrations along a different axis, and each of motors 132 within FIG. 1 may include its own internal sensor. The overall current supplied to the drive unit may be controlled by input from the vibration detection sensors 160, while individual motors may be controlled by their own internal sensors.

FIG. 11 is a flowchart illustrating a method 1100 of electrical control of a coupling to dynamically generate countervibration in an illustrative embodiment. Assume, for this embodiment, that motors within a core of the coupling are electrically coupled with sensors such as those described above in FIG. 10. In step 1102, one or more of the sensors receive mechanical vibrations which cause them to vibrate, resulting in an oscillating change in resistance. In step 1104, one or more motors at the coupling generate magnetic pulses at a rate corresponding with the rate of vibration of the sensors. In step 1106, the magnetic pulses cause eccentric flywheels to spin at the rate of the received mechanical vibration, but in the opposite direction to the received mechanical vibration. This results in a countervibration that stabilizes the coupling. Input from the sensors is used to adjust countervibrations on an ongoing basis. Thus, the sampling rate of the sensors may be chosen to be at least the rate at which vibration engines at the coupling may oscillate. For example, the sensors may sample at a rate of hundreds of times per second, or hundreds of thousands of times per second.

Figure 12:
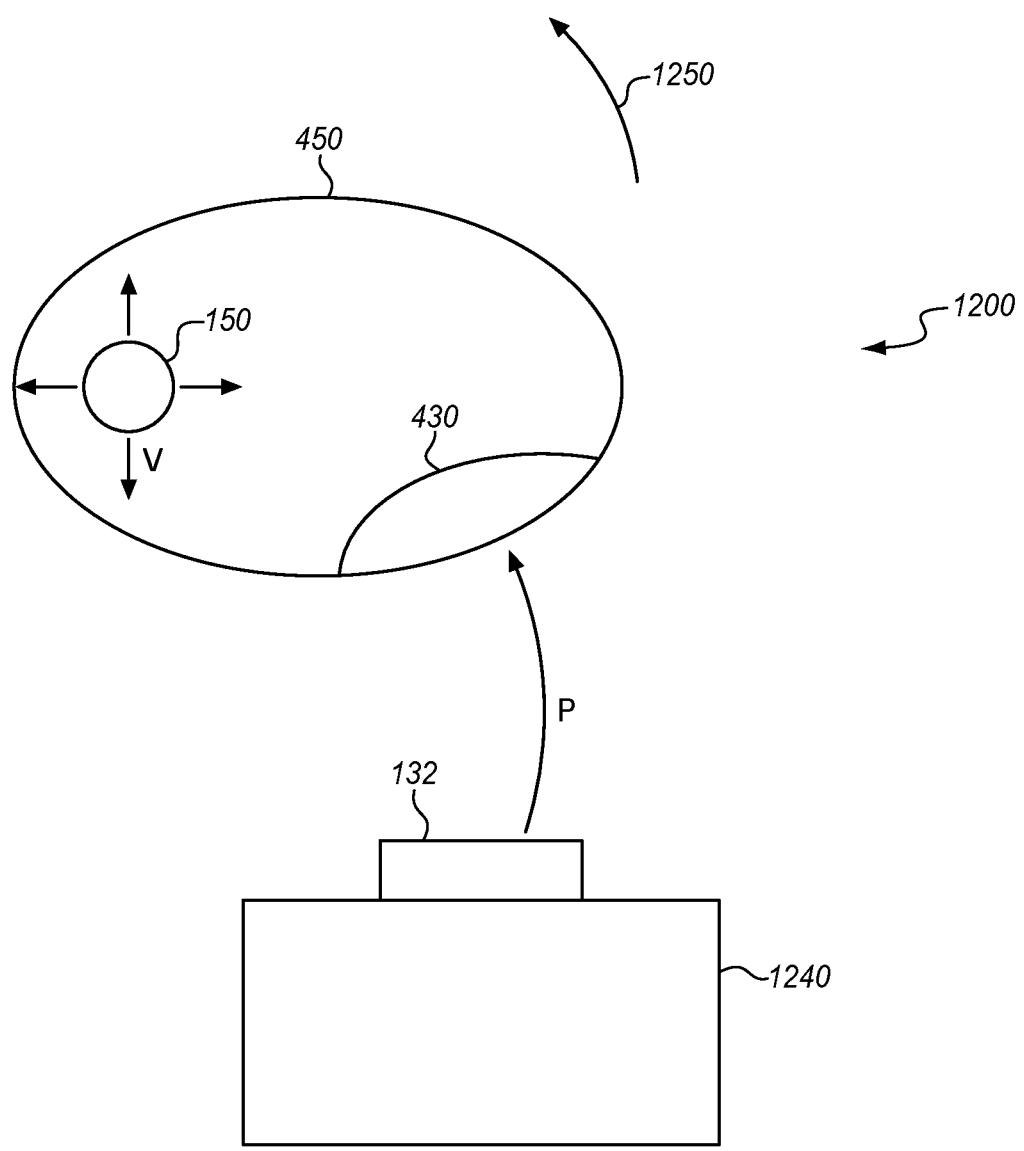
FIG. 12 is a diagram illustrating a magnetically driven eccentric flywheel in an illustrative embodiment.

FIG. 12 is a diagram 1200 illustrating a magnetically driven eccentric flywheel in an illustrative embodiment. Eccentric flywheel 450 includes a magnetic portion 430, and is mounted to a ring 150, and is driven into motion by a motor 132 that generates magnetic pulses. When eccentric flywheel 450 spins in direction 1250, in response to a pulsed magnetic force P from field generator 1230, it generates vibrations V in a controlled manner that counter detected vibrations at a coupling. Motor 132 is powered by power supply 1240.

Figure 13:
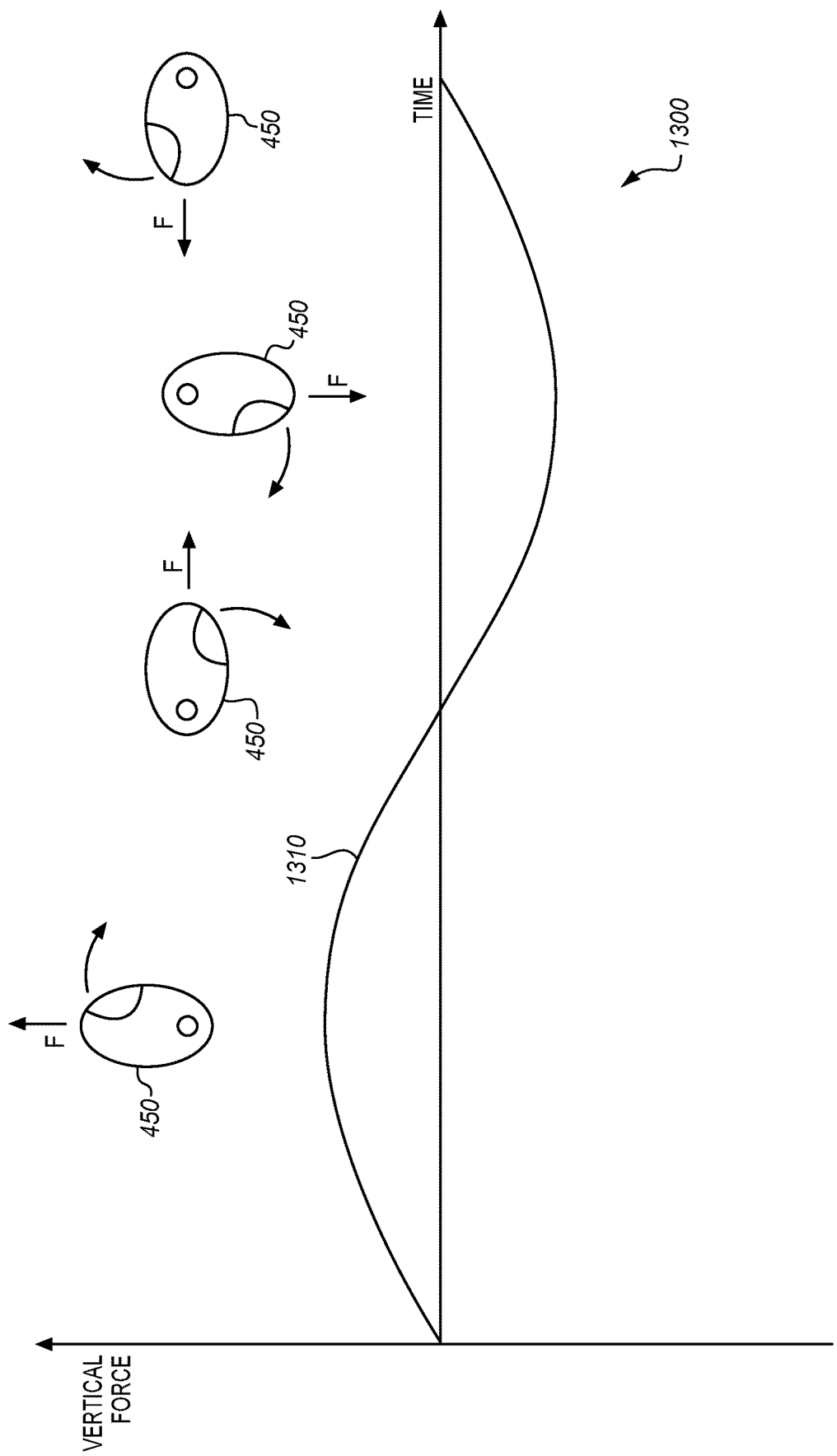
FIG. 13 is a diagram illustrating a vertical component of forces applied by an eccentric flywheel at various positions in an illustrative embodiment.

FIG. 13 is a diagram 1300 illustrating a vertical component 1310 of forces F applied by an eccentric flywheel 450 at various positions in an illustrative embodiment. FIG. 13 illustrates that as an eccentric flywheel spins, it generates oscillating forces in the vertical direction.

Figure 14:
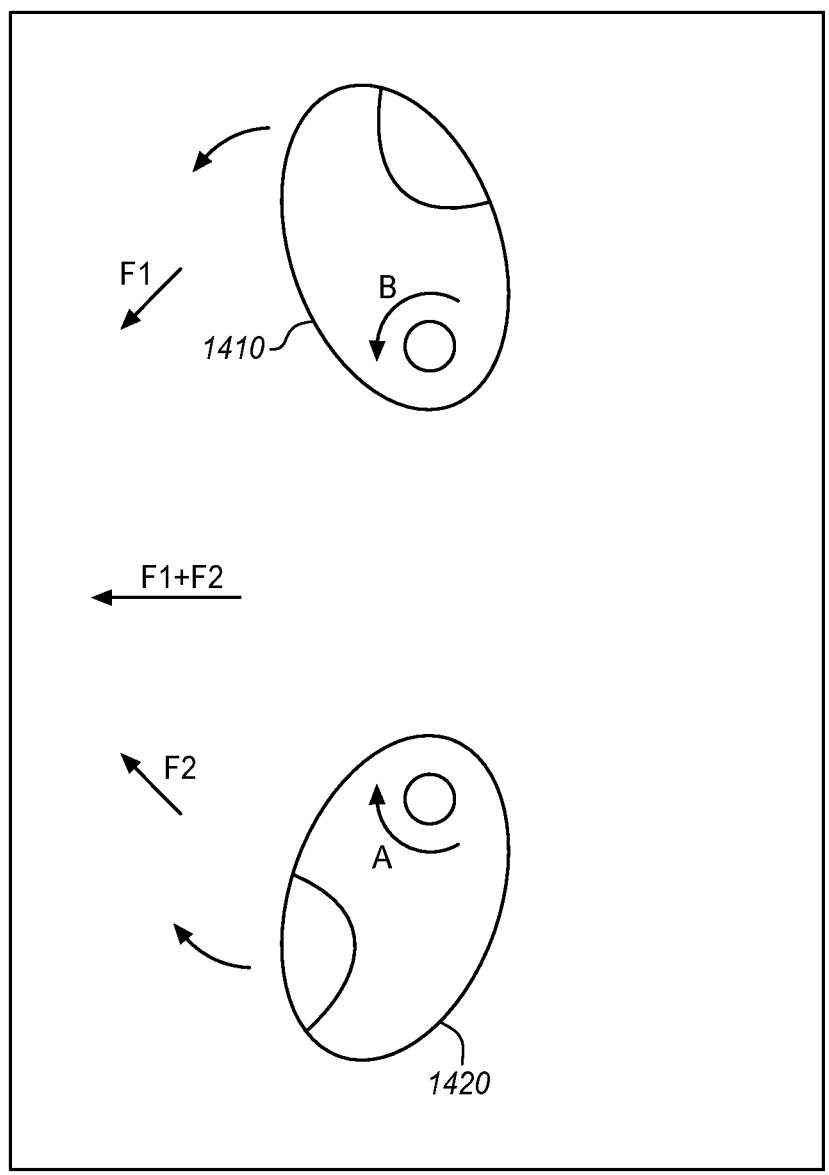
FIG. 14 is a diagram illustrating complementary eccentric flywheels in an illustrative embodiment.

FIG. 14 is a diagram 1400 illustrating complementary eccentric flywheels in an illustrative embodiment. FIG. 14 specifically illustrates how complementary flywheels may spin in a synchronized manner in order to generate forces in specific directions. FIG. 14 depicts a flywheel 1410 that generates a force F1 downward and to the left, and a flywheel 1420 that generates a force F2 upward and to the left. Flywheel 1410 spins counterclockwise, resulting in a moment A, while flywheel 1420 spins clockwise at the same rate, resulting in moment B of equal magnitude. When synchronized as shown in FIG. 14, this means that the flywheels cancel out each other's moments, yet generate a combined force F1+F2 composed of force F1 and force F2 while spinning. Combined force F1+F2 generates net momentum laterally towards the left of the page in an oscillating fashion. These principles may be expanded out to couplings such as coupling 100 of FIG. 1 in order to programmatically generate vibrations in any desired direction.

EXAMPLES

In the following examples, additional processes, systems, and methods are described in the context of a coupling that actively damps mechanical vibration.

Figure 15:
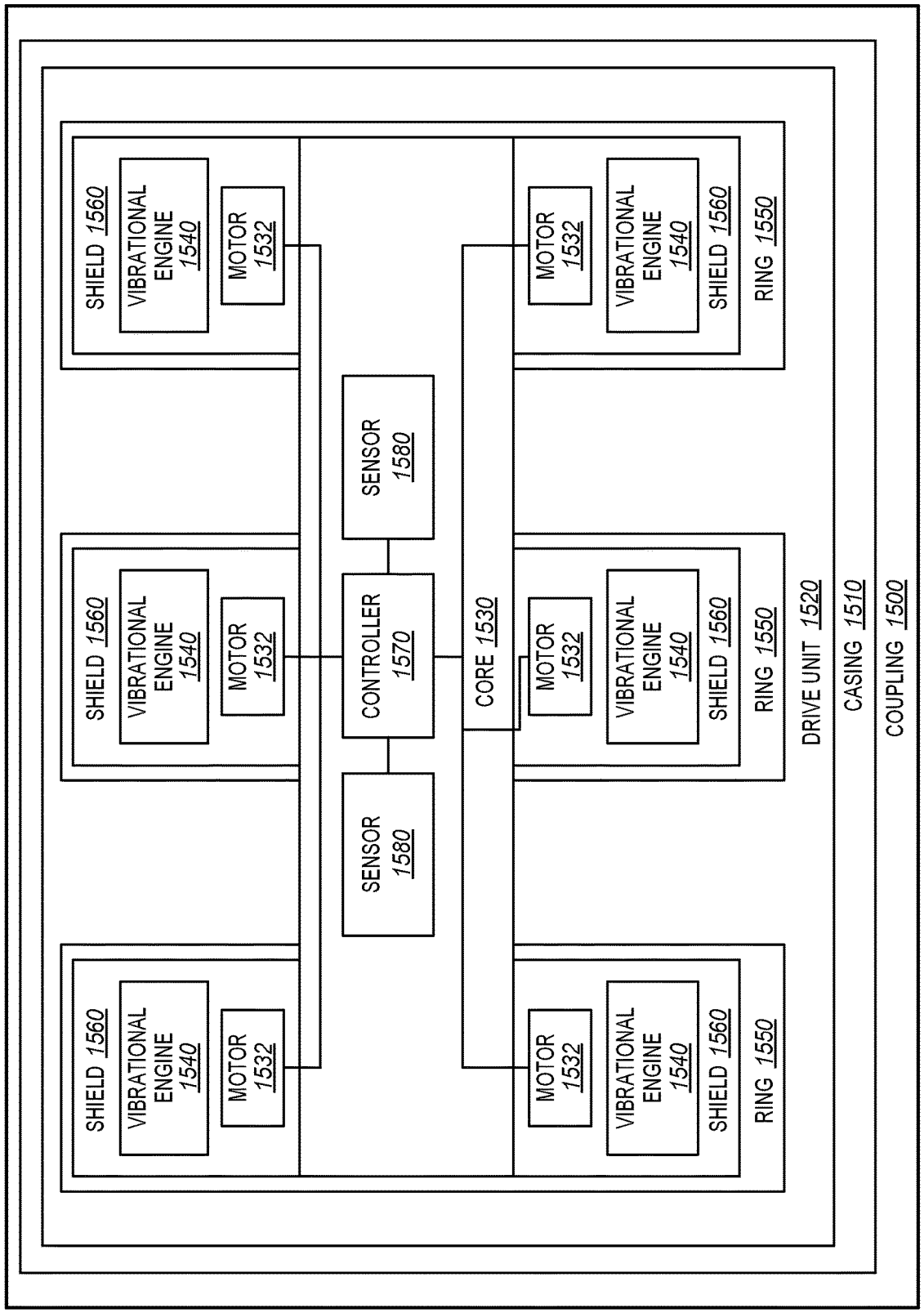
FIG. 15 is a block diagram of a coupling within a fabrication environment in an illustrative embodiment.

FIG. 15 is a block diagram of a coupling 1500 in an illustrative embodiment. Coupling 1500 includes a casing 1510 which surrounds a drive unit 1520. Motors 1532 within a core 1530 of drive unit 1520 are used to drive vibration engines 1540. Vibration engines 1540 are arranged in rings 1550, and are separated by shields 1560. Vibration engines 1540 may be implemented, for example, as flywheels. Shields 1560 prevent motors 1532 from driving multiple vibration engines 1540 at once, and hence enable vibration engines 1540 to be independently controlled. Controller 1570 receives input from sensors 1580, and controls operations of motors 1532 based on this input in order to generate countervibrations. For example, controller 1570 may determine the magnitude, direction, and frequency of a received vibration at coupling 1500 based on input from sensors 1580. Controller 1570 may further drive complementary flywheels at rates equal to the frequency, in a direction opposed to the direction of the vibration, in order to counter the vibration. Controller 1570 may be implemented, for example, as custom circuitry, as a hardware processor executing programmed instructions, or some combination thereof.

Figure 16:
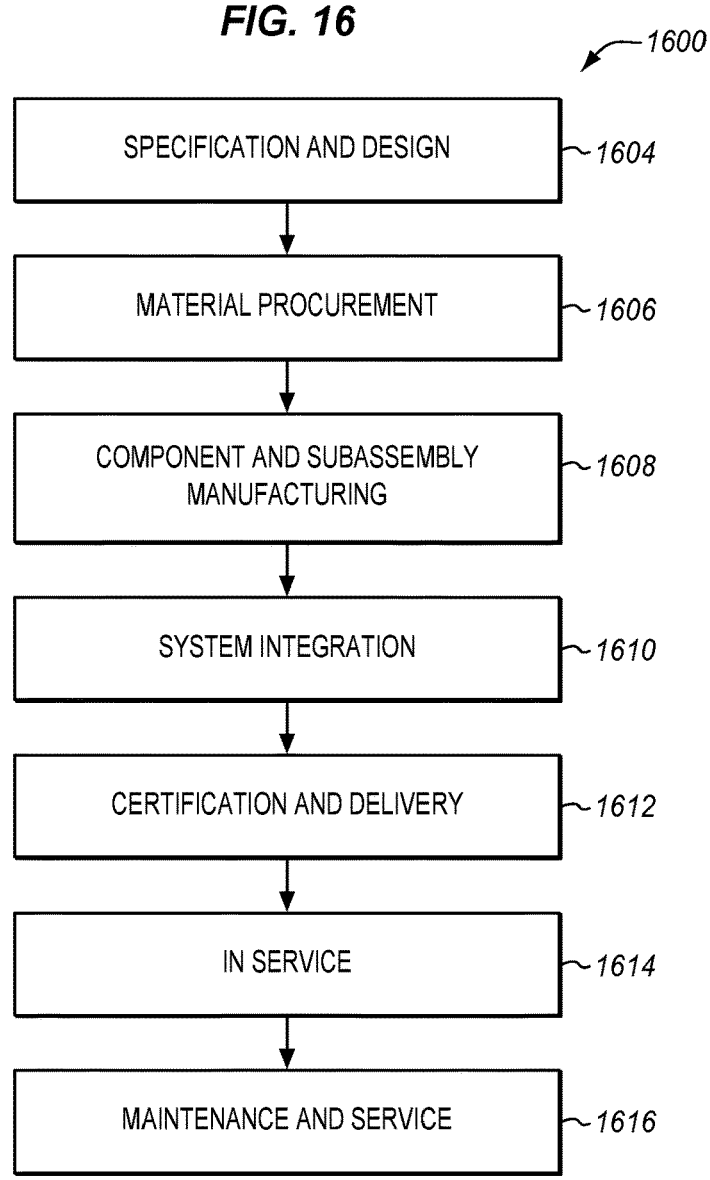
FIG. 16 is a flow diagram of aircraft production and service methodology in an illustrative embodiment.
Figure 17:
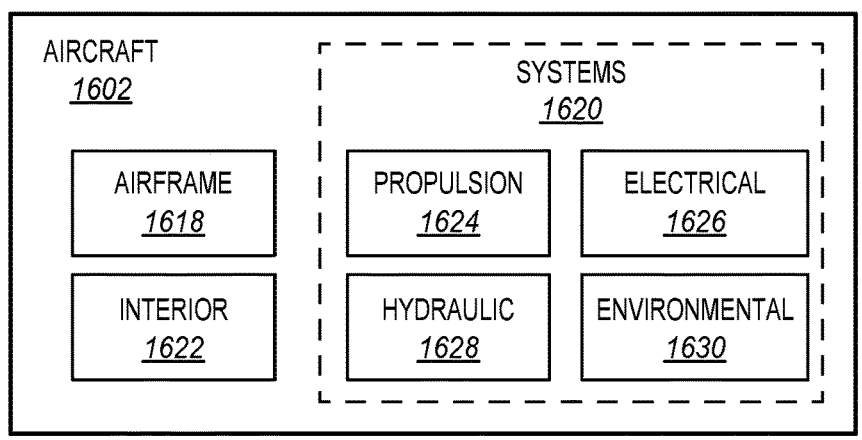
FIG. 17 is a block diagram of an aircraft in an illustrative embodiment.

Referring more particularly to the drawings, embodiments of the disclosure may be described in the context of aircraft manufacturing and service in method 1600 as shown in FIG. 16 and an aircraft 1602 as shown in FIG. 17. During pre-production, method 1600 may include specification and design 1604 of the aircraft 1602 and material procurement 1606. During production, component and subassembly manufacturing 1608 and system integration 1610 of the aircraft 1602 takes place. Thereafter, the aircraft 1602 may go through certification and delivery 1612 in order to be placed in service 1614. While in service by a customer, the aircraft 1602 is scheduled for routine work in maintenance and service 1616 (which may also include modification, reconfiguration, refurbishment, and so on). Apparatus and methods embodied herein may be employed during any one or more suitable stages of the production and service described in method 1600 (e.g., specification and design 1604, material procurement 1606, component and subassembly manufacturing 1608, system integration 1610, certification and delivery 1612, service 1614, maintenance and service 1616) and/or any suitable component of aircraft 1602 (e.g., airframe 1618, systems 1620, interior 1622, propulsion system 1624, electrical system 1626, hydraulic system 1628, environmental 1630). For example, the apparatus described herein may facilitate vibrational isolation of systems 1620 from each other within an aircraft in service, may be used to damp vibrations in production and service, etc.

Each of the processes of method 1600 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 17, the aircraft 1602 produced by method 1600 may include an airframe 1618 with a plurality of systems 1620 and an interior 1622. Examples of systems 1620 include one or more of a propulsion system 1624, an electrical system 1626, a hydraulic system 1628, and an environmental system 1630. Any number of other systems may be included. Although an aerospace example is shown, the principles of the invention may be applied to other industries, such as the automotive industry.

As already mentioned above, apparatus and methods embodied herein may be employed during any one or more of the stages of the production and service described in method 1600. For example, components or subassemblies corresponding to component and subassembly manufacturing 1608 may be fabricated or manufactured in a manner similar to components or subassemblies produced while the aircraft 1602 is in service. Also, one or more apparatus embodiments, method embodiments, or a combination thereof may be utilized during the subassembly manufacturing 1608 and system integration 1610, for example, by substantially expediting assembly of or reducing the cost of an aircraft 1602. Similarly, one or more of apparatus embodiments, method embodiments, or a combination thereof may be utilized while the aircraft 1602 is in service, for example and without limitation during the maintenance and service 1616. For example, the techniques and systems described herein may be used for material procurement 1606, component and subassembly manufacturing 1608, system integration 1610, service 1614, and/or maintenance and service 1616, and/or may be used for airframe 1618 and/or interior 1622. These techniques and systems may even be utilized for systems 1620, including, for example, propulsion system 1624, electrical system 1626, hydraulic 1628, and/or environmental system 1630.

In one embodiment, a part comprises a portion of airframe 1618, and is manufactured during component and subassembly manufacturing 1608. The part may then be assembled into an aircraft in system integration 1610, and then be utilized in service 1614 until wear renders the part unusable. Then, in maintenance and service 1616, the part may be discarded and replaced with a newly manufactured part. Inventive components and methods may be utilized throughout component and subassembly manufacturing 1608 in order to manufacture new parts.

Any of the various control elements (e.g., electrical or electronic components) shown in the figures or described herein may be implemented as hardware, a processor implementing software, a processor implementing firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, a control element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments are described herein, the scope of the disclosure is not limited to those specific embodiments. The scope of the disclosure is defined by the following claims and any equivalents thereof.

What is claimed is:

1. A method for damping vibration in a mechanical system, the method comprising:
   detecting a vibration at a coupling of the mechanical system, by detecting changes in resistance at piezoelectric sensors disposed at the coupling;
   generating a countervibration based on the detected vibration via a flywheel disposed at the coupling, by applying pulsed magnetic forces to the flywheel; and
   operating the mechanical system while generating the countervibration.

2. The method of claim 1 further comprising:
   determining a magnitude and a frequency of the vibration at the coupling, wherein
   generating the countervibration comprises driving vibration engines at the coupling based on the magnitude and the frequency of the detected vibration.

3. The method of claim 2 wherein:
   driving the vibration engines comprises selectively rotating flywheels that are disposed at different angular positions along a ring within the coupling.

4. The method of claim 2 wherein:
   determining the magnitude and the frequency of the vibration comprises:
   calculating the magnitude and the frequency based on the changes in resistance over time.

5. The method of claim 2 further comprising:
   driving the vibration engines prior to detecting the vibration to generate complementary vibrations that combine at the coupling without displacing the coupling.

6. The method of claim 1 wherein:
the magnetic forces are applied to a magnetic portion of the flywheel.

7. The method of claim 1 wherein:
the magnetic forces are applied intermittently to the flywheel to generate the countervibration.

8. The method of claim 1 wherein:
as the flywheel spins, it generates oscillating forces in a direction.

9. A non-transitory computer readable medium embodying programmed instructions which, when executed by a processor, are operable for performing a method for damping vibration in a mechanical system, the method comprising
detecting a vibration at a coupling of the mechanical system, by detecting changes in resistance at piezoelectric sensors disposed at the coupling;
generating a countervibration based on the detected vibration via a flywheel disposed at the coupling, by applying pulsed magnetic forces to the flywheel; and
operating the mechanical system while generating the countervibration.

10. The medium of claim 9 wherein the method further comprises:
determining a magnitude and a frequency of the vibration at the coupling, wherein
generating the countervibration comprises driving vibration engines at the coupling based on the magnitude and the frequency of the detected vibration.

11. The medium of claim 10 wherein:
driving the vibration engines comprises selectively rotating flywheels that are disposed at different angular positions along a ring within the coupling.

12. The medium of claim 10 wherein:
determining the magnitude and the frequency of the vibration comprises:
calculating the magnitude and the frequency based on the changes in resistance over time.

13. The medium of claim 10 wherein the method further comprises:
driving the vibration engines prior to detecting the vibration to generate complementary vibrations that combine at the coupling without displacing the coupling.

14. The medium of claim 9 wherein:
the magnetic forces are applied to a magnetic portion of the flywheel.

15. The medium of claim 9 wherein:
the magnetic forces are applied intermittently to the flywheel to generate the countervibration.

16. The medium of claim 9 wherein:
as the flywheel spins, it generates oscillating forces in a direction.

17. An apparatus for damping vibration in a mechanical system, the apparatus comprising:
a coupling comprising:
vibration detection sensors at the coupling;
vibration engines at the coupling that comprise flywheels that are eccentric; and
a controller that is coupled for communication with the vibration sensors and the vibration engines, and is configured to determine a magnitude and a frequency of a vibration detected by the vibration detection sensors, and to direct the vibration engines to generate a countervibration based on the magnitude and the frequency, wherein:
generating the countervibration comprises applying pulsed magnetic forces to at least one of the flywheels.

18. The apparatus of claim 17 wherein:
the vibration engines are arranged in multiple rings, each ring including vibration engines disposed at different angular positions.

19. The apparatus of claim 17 further comprising:
pulse generators that each apply magnetic forces to a different vibration engine, and
magnetic shielding that isolates each vibration engine and corresponding pulse generator from other vibration engines and pulse generators.

20. The apparatus of claim 17 wherein:
the vibration detectors comprise piezoelectric sensors.

* * * * *